United States Patent [19]

Kollmeier et al.

[11] Patent Number: 4,529,743
[45] Date of Patent: Jul. 16, 1985

[54] PROCESS FOR THE PRODUCTION OF RIGID POLYURETHANE FOAMS

[75] Inventors: Hans-Joachim Kollmeier, Essen; Rolf-Dieter Langenhagen, Hattingen-Niederwenigern, both of Fed. Rep. of Germany

[73] Assignee: TH. Goldschmidt AG, Essen, Fed. Rep. of Germany

[21] Appl. No.: 660,497

[22] Filed: Oct. 12, 1984

[30] Foreign Application Priority Data

Oct. 20, 1983 [DE] Fed. Rep. of Germany ....... 3338106

[51] Int. Cl.$^3$ ............................................. C08G 18/14
[52] U.S. Cl. .................................... 521/112; 525/479; 528/25; 528/29; 556/453; 556/456
[58] Field of Search ........................ 521/112; 525/479; 528/25, 29; 556/453, 456

[56] References Cited

U.S. PATENT DOCUMENTS 3,507,815  4/1970  Bailey et al. .................... 521/112
3,637,541  1/1972  Rossmy ........................... 521/111
3,714,080  1/1973  Dahm et al. ...................... 521/111
4,420,409 12/1983  Fukano et al. .................... 556/456

Primary Examiner—Maurice J. Welsh
Attorney, Agent, or Firm—Toren, McGeady, Stanger, Goldberg & Kiel

[57] ABSTRACT

In a process for producing rigid polyurethane foams, polysiloxane-polyoxyalkylene block copolymers having the formula

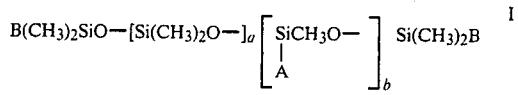

are used, in which A represents polyoxyalkylene blocks $A^1$ or $A^2$ having the formula $-R^2-O-(C_mH_{2m}O)_yR^1$, which are linked to silicon by an SiC bond and in which $R^1$ represents a hydrogen atom or an alkyl radical with 1 to 4 carbon atoms, $R^2$ represents a bridging group, y is a whole number, and m has a value of 2.0 to 2.6, with the proviso that:

a. the $A^1$ blocks comprise 70 to 100 weight percent oxyethylene units, the remainder being oxypropylene units, and have a molecular weight from about 250 to 1,000,
b. the $A^2$ blocks comprise 35 to 65 weight percent oxyethylene units, the remainder being oxypropylene units, and have a molecular weight from about 600 to 1,500,
c. the molar ratio of the $A^1$ block to the $A^2$ blocks is 85:15 to 15:85 and there is at least one block of $A^1$ and block of $A^2$ in the average molecule;

B is a methyl radical or an $A^1$ or $A^2$ polyoxyalkylene block;

a has a value of 15 to 150, and b has a value of 5 to 20, when B is a methyl radical, and a value of 3 to 18, when B represents $A^1$ or $A^2$.

13 Claims, No Drawings

PROCESS FOR THE PRODUCTION OF RIGID POLYURETHANE FOAMS

BACKGROUND OF THE INVENTION

1. Field of the Invention

The invention relates to a process for the production of rigid polyurethane foams from at least difunctional polyisocyanates, polyols with at least two hydroxyl groups per molecule whose equivalent weight per hydroxyl groups is about 50 to 800, catalysts, blowing agents and polysiloxane polyoxyalkylene block copolymers as foam stabilizers and, if necessary, conventional additives.

2. Description of the Prior Art

Rigid polyurethane foams are produced in large quantities by conventional processes using known raw materials. A summary of the raw materials which may be used and the applicable processes may be found in Ullmann's "Enzyklopädie der technischen Chemie" (Encyclopedia of Chemical Engineering), 1980, Vol. 19, pages 301 to 341, and Kunststoff-Handbuch (Plastics Handbook) Vol. VII, Polyurethanes, by R. Vieweg and A. Höchtlen, Carl Hanser Verlag, Munich, 1966, pages 504 to 544, as well as in "Polyurethanes" Kunststoff-Handbuch (Plastics Handbook) 7, by G. Oertel, Carl Hanser Verlag, Munich, 1983, pages 246 to 331.

Rigid polyurethane foams are preferably used for thermal insulation. They may also be foamed into molded articles, such as, panels. Additionally, it is possible to fill hollow spaces of all types with foam, in which case, the foam in the hollow space acts as a structural element and then must also have load-bearing properties. For example, filling doors and housings of refrigerators, or the hollow spaces of surfboards, or structural members, pipes, and automobile components with foam is known.

In the foaming process, the mixture of materials to be foamed is introduced into the hollow space which is to be filled with foam. The rising foam must then fill the hollow space of the mold uniformly and be in the form of fine cells before it cures. However, defects are frequently formed in the foam when such hollow spaces or molded articles are foamed. Such defects may occur in the form of small holes or voids. Frequently, destroyed cell structures or areas of different foam density are observed, especially in the edge regions. The bond of the foam to the surface of the inner wall of the mold is especially weakened by these defects, so that the mechanical properties of the foamed molded part as a whole are affected.

It was found that the quality and the properties of the rigid foam formed depend in a large degree on the structure and the chemical composition of the foam stabilizer used. For this reason, polysiloxane polyoxyalkylene block copolymers of different structure and different composition have already been used as foam stabilizers.

Polysiloxane-polyoxyalkylene block copolymers used for the aforementioned purpose include hydrolysis-resistant siloxane-oxyalkylene copolymers having the general formula:

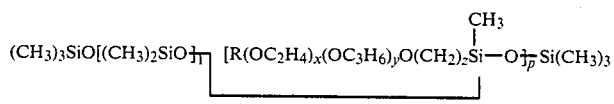

wherein $l=3$ to 25; $x=1$ to 25; $y=0$ to 15; $z=2$ or 3; $p=1$ to 10; $R=$hydrogen or methyl, with the proviso that at least 25 weight percent of the oxyalkylene groups are oxyethylene groups and, when $R=H$, the hydroxyl groups comprise at least 1.5 weight percent of the copolymer. These are described, for example, in German Auslegeschrift No. 17 19 238.

According to German Pat. No. 20 29 293, siloxane-modified carbamic acid derivatives are used for the production of polyurethane foams. These carbamic acid derivatives comprise at least one structural unit having the following general formula:

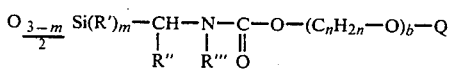

to which other structural units having the general formula:

are linked by Si-O-Si bridges with at least one of a thousand structural units corresponding to the first-mentioned formula and wherein R' represents $C_1$-$C_{10}$-alkyl, $C_4$-$C_{10}$-cycloalkyl or $C_6$-$C_{10}$-aryl radical which, optionally, may be halogenated or cyano-substituted;

R" represents a hydrogen atom, or a methyl or phenyl radical;

R'" represents a $C_1$-$C_{10}$-alkyl, $C_4C_{10}$-cycloalkyl, $C_2$-$C_{10}$-alkenyl, $C_7$-$C_{10}$ aralkyl, di-(C-$C_{10}$-alkyl)amino-$C_1$-$C_{10}$-alkyl, $C_6$-$C_{10}$-aryl or $C_7$-$C_{10}$ alkaryl radical;

Q represents a saturated $C_1$-$C_6$ alkyl radical or $C_6$-aryl radical;

m is 1 or 2;

n is 2, 3 or 4; and b is a whole number from 1 to 200;

and wherein these radicals and numerical values are independent of each other at each side in a molecule.

Additional, particularly suitable polysiloxane-polyoxyalkylene block copolymers are disclosed in German Pat. No. 16 94 366. The patent describes a process for the production of polyurethane foams wherein polyoxyalkylene-polysiloxane block copolymers whose polysiloxane block is synthesized by known methods is used. However, the polyoxyalkylene block consists of 25 to 70 weight percent of a polyoxyalkylene with an average molecular weight of 1,600 to 4,000 and an ethylene oxide content of 20 to 100 weight percent, the remainder being propylene oxide and, optionally, higher alkylene oxides; and 30 to 75 weight percent of a polyoxyalkylene with an average molecular weight of 400 to 1,200 and an ethylene oxide content of 65 to 100 weight percent, the remainder being propylene oxide and, optionally, higher alkylene oxides. Therefore, this patent is based on the fact that polyoxyalkylene blocks of defined, different construction and therefore different hydrophilicities, are contained in the block copolymer.

Practice has shown that foam stabilizers, known from the state of the art, do not always produce satisfactory rigid polyurethane foams and that defects occur time and again in the edge zones, which defects affect the mechanical properties of the foam-filled molded articles and also lower the thermal insulation.

SUMMARY OF THE INVENTION

We have discovered a method for making foam stabilizers based on the state of the art which are especially suitable for the production of rigid polyurethane foams for the purpose of filling hollow spaces with foam and for foaming in situ.

More particularly, we have discovered that starting from the teachings of German Pat. No. 16 94 366, rigid polyurethane foams of the desired properties are achieved if polysiloxane-polyoxyalkylene block copolymers having the formula

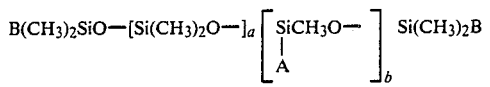

are used, in which

A represents polyoxyalkylene blocks $A^1$ or $A^2$ of the general formula $-R^2-O-(C_mH_{2m}O)_yR^1$, which are linked to silicon by an SiC bond and in which $R^1$ represents a hydrogen atom or an alkyl radical with 1 to 4 carbon atoms, $R^2$ represents a bridging group, y is a whole number, and m has a value of 2.0 to 2.6, with the proviso that a the $A^1$ blocks comprise 70 to 100 weight percent oxyethylene units, the remainder being oxypropylene units, and have a molecular weight of 250 to 1,000, b the $A^2$ blocks comprise 35 to 65 weight percent oxyethylene units, the remainder being oxypropylene units, and have a molecular weight of 600 to 1,500, c the molar ratio of the $A^1$ block to the $A^2$ blocks is 85:15 to 15:85 and there is at least one block of $A^1$ and block of $A^2$ in the average molecule;

B is a methyl radical or an $A^1$ or $A^2$ polyoxyalkylene block;

a has a value of 15 to 150, and b has a value of 5 to 20, when B is a methyl radical, and a value of 3 to 18, when B represents $A^1$ or $A^2$.

DESCRIPTION OF THE PREFERRED EMBODIMENT

The foam stabilizers of the present invention are defined by the following characteristics:

The polyoxyalkylene blocks are attached laterally and, optionally, terminally through silicon-carbon bonds to a linear methylpolysiloxane.

The number of dimethylsiloxy units in the average molecule is 15 to 150, the number of methylsiloxy units which carry polyoxyalkylene blocks is 5 to 20, when B is a methyl radical and when B is an $A^1$ or $A^2$ block, the number of methylsiloxy units is 3 to 18. Preferably, when the value of b is higher, the value of a is also correspondingly higher.

Polyoxyalkylene blocks are linked through carbon atoms to silicon. The bridging group generally is an alkylene group with preferably 3 carbon atoms. Other combining links are known from the state of the art, for example, from German Pat. No. 16 94 366. However, these have little effect on the properties of the stabilizers.

An important characteristic of the stabilizers used in the inventive process is that the polyoxyalkylene blocks $A^1$ and $A^2$ of different structures are linked laterally and, optionally, terminally to the siloxane. The relatively hydrophilic $A^1$ blocks consist of 70 to 100 weight percent oxyethylene units and 30 to 0 weight percent oxypropylene units and have a molecular weight of about 250 to 1,000. The $A^2$ blocks which are relatively more hydrophobic consist of 35 to 65 weight percent oxyethylene units and 65 to 35 weight percent oxypropylene units and have a molecular weight of about 600 to 1,500. The molar ratio of the $A^1$ blocks to the $A^2$ blocks is 85:15 to 15:85. It should however be noted that, at the limiting values, there must be at least one $A^1$ block and at least one $A^2$ block in the average molecule.

The oxyethylene and oxypropylene units in the polyoxyalkylene blocks may be distributed randomly or in blocks. A random distribution is obtained, for example, when the starting alcohol is reacted with a mixture of ethylene oxide and propylene oxide.

As end groups, the polyoxyalkylene blocks have OH or $OR^1$ groups, $R^1$ being an alkyl group with 1 to 4 carbon atoms, for example, the methyl, ethyl, propyl or butyl group. It is also possible that one part of the polyoxyalkylene blocks has terminal $OR^1$-groups and another part of the polyoxyalkylene blocks has OH-groups as end groups.

In the production of rigid polyurethane foams, it is frequently customary to mix the products used as foam stabilizers in one or both starting materials, i.e., polyol or isocyanate, before the foaming reaction is carried out. If the stabilizer is mixed with the polyol used in the foaming, products are preferred as inventive foam stabilizers, in which at least half the end groups of the polyoxyalkylene blocks are hydroxyl groups. The solubility of the stabilizers in the polyols to be foamed increases as their hydroxyl group content increases, so that it becomes easier to mix them with the polyols and to meter them out.

On the other hand, if it is intended to premix the foam stabilizer to be used with the isocyanate component, products are preferred whose polyoxyalkylene blocks have terminal $OR^1$ groups. Stabilizers with hydroxyl end groups can react with isocyanate even in the absence of catalysts; such a reaction reduces their stabilizing effectiveness.

The foam stabilizers of formula I for use in the inventive process, can be obtained by known procedures, such as is described in German Pat. No. 31 33 869. In this case, polyoxyalkylene ethers with terminal olefinic unsaturation are added to linear siloxanes with lateral and, optionally, terminal SiH groups.

Rigid polyurethane foams obtained by the inventive process are particularly suitable for filling hollow spaces with foam and for foaming in situ. Such foams have a fine-celled, uniform structure which is not disturbed even in the edge zones.

The inventive production of such rigid polyurethane foams and the properties of these foams are illustrated in the following examples.

EXAMPLES

The following starting materials are used for synthesizing the inventive stabilizers:

Hydrogenmethylpolysiloxane having the formula:

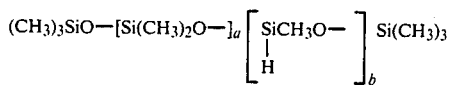

1.

with
a = 34/b = 8; a = 38/b = 10 and a = 50/b = 15;

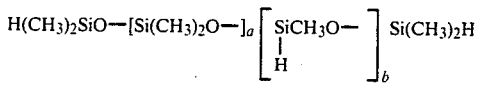

2.

with a = 35/b = 8;

Allylpolyoxyalkylene ethers having the formula $$CH_2=CH-CH_2-O-(C_2H_4O)_c-(C_3H_6O)_d-H \quad 3$$

with
c=13.0 d=0; 100 weight % EO, molecular weight 630
c=9.7 d=1.8; 80 weight % EO, molecular weight 590
c=11.0 d=8.4; 50 weight % EO, molecular weight 1030
c=12.7 d=13.3; 42 weight % EO, molecular weight 1390;

$$CH_2=CH-CH_2-O-(C_2H_4O)_c-(C_3H_6O)-{}_d-CH_3 \quad 4$$

with
c=15.4 d=11.6; 50 weight % EO, molecular weight 1420.

Block copolymers which have the composition shown in Table 1 are synthesized with these starting materials according to the process described in German Pat. No. 31 33 869.

Polyol E: Propylene oxide polyol with a hydroxyl number of 450, started on sorbitol,
Isocyanate: Polymeric diphenylmethane-4,4'-diisocyanate with an isocyanate number of 31 (trade name: crude MDI)

| Foam Formulation 1 | Parts by Weight |
|---|---|
| polyol D | 100 |
| water | 1.0 |
| triethylamine | 3.0 |
| trichlorofluoromethane | 40 |
| isocyanate | 155 |
| stabilizer | 1.0 |

| Foam Formulation 2 | Parts by Weight |
|---|---|
| polyol E | 100 |
| water | 2.0 |
| dimethylcyclohexylamine | 2.4 |
| trichlorofluoromethane | 35 |
| isocyanate | 144 |
| stabilizer | 1.5 |

The rigid polyurethane foams are prepared by conventional foaming procedures in a board mold 145 cm long, 14 cm wide and 4 cm deep. The reaction mixture to be foamed is placed in the lower part of the board mold which is inclined at an angle of 45°. In each case, two experiments are carried out, one with underfilling and one with overfilling. In order to evaluate the flowability of the foams, the board mold is underfilled by 10%. Edge zone structure and density distribution were evaluated using foamed boards, which has been pro-

TABLE 1

| Stabilizer | Hydrogenmethylpolysiloxane Formula | a | b | Polyoxyalkylene A¹ Formula | Wt. % EO | Mol. Weight | Polyoxyalkylene A² Formula | Wt. % EO | Mol. Weight | Molar Ratio A¹/A² |
|---|---|---|---|---|---|---|---|---|---|---|
| I | 1 | 34 | 8 | 3 | 100 | 630 | 3 | 42 | 1390 | 60/40 |
| II | 1 | 38 | 10 | 3 | 100 | 630 | 4 | 50 | 1420 | 60/40 |
| III | 1 | 50 | 15 | 3 | 80 | 590 | 3 | 50 | 1030 | 30/70 |
| IV | 2 | 35 | 8 | 3 | 100 | 630 | 4 | 50 | 1420 | 60/40 |
| V | 1 | 38 | 10 | 3 | 100 | 630 | — | — | — | 100/0 |
| VI | 1 | 38 | 10 | — | — | — | 3 | 42 | 1390 | 0/100 |
| VII* | 1 | 15 | 3 | 3 | 100 | 630 | — | — | — | 100/0 |

*Stabilizer VII was synthesized as a comparison substance by the procedure described in German Auslegeschrift 17 19 238.

For further comparison with the state of the art, a block copolymer of composition A of German Pat. No. 20 29 293 (Stabilizer VIII) and a block copolymer with the composition of substance C of Example 1 of German Pat. No. 16 94 366 (Stabilizer IX) are included in the test.

The performance of the inventive block copolymers was investigated in the following foam formulations 1 and 2 using the raw materials below:
Polyol D: Propylene oxide polyol with a hydroxyl number of 520, started on sucrose/glycerin, duced with about 10% overfilling.

The density distribution is determined by establishing the density in the center of the lower third and in the center of the upper third of the 145 cm long foam board and calculating the difference. The development of edge zones is evaluated by characterizing the degree of compression as follows: slightly, weakly, moderately, strongly, very strongly compressed.

The results obtained using foam formulation 1 and the inventive stabilizers and, for comparison, products of the state of the art are given in Table 2.

TABLE 2

| STABILIZER COMPARISON IN FORMULATION 1 | | | |
|---|---|---|---|
| Stabilizer | Flowability cm | Density Difference kg/m³ | Evaluation of Edge Zones |
| I according to invention | 132 | 1.3 | weakly compressed |
| II according to invention | 133 | 1.4 | weakly compressed |
| III according to invention | 132 | 1.4 | slightly compressed |
| IV according to invention | 134 | 1.0 | weakly compressed |
| V not according to invention | 129 | 2.7 | strongly compressed |

TABLE 2-continued

STABILIZER COMPARISON IN FORMULATION 1

| Stabilizer | | Flowability cm | Density Difference kg/m³ | Evaluation of Edge Zones |
|---|---|---|---|---|
| VI | not according to invention | 131 | 2.4 | moderately compressed |
| VII* | not according to invention | 132 | 2.3 | strongly compressed |
| VIII** | not according to invention | 133 | 2.2 | moderately compressed |
| IX*** | not according to invention | 128 | 2.9 | strongly compressed |

\* = German Auslegeschrift 17 19 238
\*\* = German Patent 20 29 293
\*\*\* = German Patent 16 94 366

The results show that the inventive stabilizers and the products of the state of the art produce a similar flowability, the former are, however, clearly superior in respect of density distribution and edge zone compression. On the other hand, stabilizers V and VI, which contain the same polysiloxanes but only a uniform polyether block, show no advantages.

The results obtained using foam formulation 2 and the inventive stabilizers and, for comparison, products of the states of the art, are given in Table 3.

TABLE 3

STABILIZER COMPARISON IN FORMULATION 2

| Stabilizer | | Flowability cm | Density Difference kg/m³ | Evaluation of Edge Zones |
|---|---|---|---|---|
| I | according to invention | 139 | 1.1 | weakly compressed |
| II | according to invention | 140 | 1.2 | moderately compressed |
| III | according to invention | 140 | 0.9 | slightly compressed |
| IV | according to invention | 141 | 1.2 | weakly compressed |
| V | not according to invention | 134 | 2.4 | strongly compressed |
| VI | not according to invention | 138 | 2.2 | strongly compressed |
| VII* | not according to invention | 136 | 2.4 | moderately compressed |
| VIII** | not according to invention | 141 | 2.0 | moderately compressed |
| IX*** | not according to invention | 134 | 2.6 | very strongly compressed |

\* = German Auslegeschrift 17 19 238
\*\* = German Patent 20 29 293
\*\*\* = German Patent 16 94 366

With this formulation also, the inventive block copolymers produce a good flowability and, compared to products of the state of the art as well as to stabilizes V and VI which have a uniform polyether block, a clear improvement in edge zone development and density distribution.

We claim:

1. In a process for producing rigid polyurethane foams by the reaction of polyisocyanates which are at least difunctional with polyols having at least two hydroxyl groups per molecule and having an equivalent weight per hydroxy group of about 50 to 800 in the presence of a catalyst, a blowing agent and a polysiloxane-polyoxyalkylene block copolymer foam stabilizer, the improvement which comprises said foam stabilizer having the formula

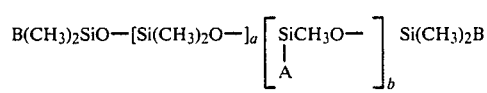

are used, in which
A represents polyoxyalkylene blocks $A^1$ or $A^2$ having the formula $-R^2-O-(C_mH_{2m}O)_yR^1$, which are linked to silicon by an SiC bond and in which
 $R^1$ represents a hydrogen atom or an alkyl radical with 1 to 4 carbon atoms,
 $R^2$ represents a bridging group,
 y is a whole number, and
 m has a value of 2.0 to 2.6, with the proviso that a the $A^1$ blocks comprise 70 to 100 weight percent oxyethylene units, the remainder being oxypropylene units, and have a molecular weight from about 250 to 1,000, b the $A^2$ blocks comprise 35 to 65 weight percent oxyethylene units, the remainder being oxypropylene units, and have a molecular weight from about 600 to 1,500, c the molar ratio of the $A^1$ block to the $A^2$ blocks is 85:15 to 15:85 and there is at least one block of $A^1$ and block of $A^2$ in the average molecule;
B is a methyl radical or an $A^1$ or $A^2$ polyoxyalkylene block;
a has a value of 15 to 150, and
b has a value of 5 to 20, when B is a methyl radical, and a value of 3 to 18, when B represents $A^1$ or $A^2$.

2. The process of claim 1 wherein blocks $A^1$ and $A^2$ are linked laterally to the siloxane.

3. The process of claim 1 wherein blocks $A^1$ and $A^2$ are linked laterally and terminally to the siloxane.

4. A foam stabilizer for use in producing rigid polyurethane foams having the formula

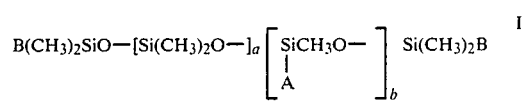

are used, in which
A represents polyoxyalkylene blocks $A^1$ or $A^2$ having the formula $-R^2-O-(C_mH_{2m}O)_yR^1$, which are linked to silicon by an SiC bond and in which
 $R^1$ represents a hydrogen atom or an alkyl radical with 1 to 4 carbon atoms,
 $R^2$ represents a bridging group,
 y is a whole number, and
 m has a value of 2.0 to 2.6, with the proviso that
a the $A^1$ blocks comprise 70 to 100 weight percent oxyethylene units, the remainder being oxypropylene units, and have a molecular weight from about 250 to 1,000, b the $A^2$ blocks comprise 35 to 65 weight percent oxyethylene units, the remainder being oxypropylene units, and have a molecular weight from about 600 to 1,500, c the molar ratio of the $A^1$ block to the $A_2$ blocks is 85:15 to 15:85 and there is at least one block of $A^1$ and block of $A^2$ in the average molecule;

B is a methyl radical or an $A^1$ or $A^2$ polyoxyalkylene block;

a has a value of 15 to 150, and b has a value of 5 to 20, when B is a methyl radical, and a value of 3 to 18, when B represents $A^1$ or $A^2$.

5. The stabilizer of claim 4 wherein blocks $A^1$ and $A^2$ are linked laterally to the siloxane.

6. The stabilizer of claim 4 wherein blocks $A^1$ and $A^2$ are linked laterally and terminally to the siloxane.

7. A foam made by the process of claim 1.

8. A foam made by the process of claim 2.

9. A foam made by the process of claim 3.

10. An article filled with a foam made by the process of claim 1.

11. An article filled with a foam made by the process of claim 2.

12. An article filled with a foam made by the process of claim 3.

13. The article of claim 1 wherein said article is a structural member.

* * * * *